United States Patent
Nakamura et al.

(10) Patent No.: US 7,347,296 B2
(45) Date of Patent: Mar. 25, 2008

(54) FRONT STRUCTURE OF ALL TERRAIN VEHICLE

(75) Inventors: Eiichi Nakamura, Hamamatsu (JP); Takuya Kusaka, Hamamatsu (JP)

(73) Assignee: Suzuki Kabushiki Kaisha, Hamamatsu-Shi (JP)

( * ) Notice: Subject to any disclaimer, the term of this patent is extended or adjusted under 35 U.S.C. 154(b) by 315 days.

(21) Appl. No.: 11/175,190

(22) Filed: Jul. 7, 2005

(65) Prior Publication Data

US 2006/0006010 A1 Jan. 12, 2006

(30) Foreign Application Priority Data

Jul. 8, 2004 (JP) .............................. 2004-201834

(51) Int. Cl.
*B60K 11/08* (2006.01)
(52) U.S. Cl. ...................... 180/68.1; 180/292; 180/296
(58) Field of Classification Search ................ 180/309, 180/68.1, 68.2, 68.3, 68.4, 292, 296; 474/93
See application file for complete search history.

(56) References Cited

U.S. PATENT DOCUMENTS

| | | | | |
|---|---|---|---|---|
| 3,467,177 A | * | 9/1969 | Hoddinott | 165/47 |
| 4,708,699 A | * | 11/1987 | Takano et al. | 474/144 |
| 4,744,432 A | * | 5/1988 | Shibata et al. | 180/68.1 |
| 5,976,044 A | * | 11/1999 | Kuyama | 474/93 |
| 6,907,916 B2 | * | 6/2005 | Koyama | 165/67 |
| 6,938,676 B2 | * | 9/2005 | Lan et al. | 165/41 |
| 7,059,438 B1 | * | 6/2006 | Sheets | 180/68.1 |

FOREIGN PATENT DOCUMENTS

JP 2000-313382 * 11/2000

* cited by examiner

*Primary Examiner*—Frank Vanaman
(74) *Attorney, Agent, or Firm*—Oblon, Spivak, McClelland, Maier & Neustadt, P.C.

(57) ABSTRACT

An all terrain vehicle for smoothly introducing an exhaust air from a radiator rearward and improving cooling performance for cooling respective members of the vehicle is provided with a front structure, in which a cooling fan is provided on a rear surface of the radiator so that a central portion of the cooling fan is offset from a center of the radiator toward a side opposite to a side on which the belt transmission is arranged, an exhaust pipe connected to a front portion of the cylinder assembly is provided to extend toward the side on which the belt transmission is arranged so that the exhaust pipe extends downward at a portion above the belt transmission, and the inlet duct is provided on the side on which the exhaust pipe is provided so as to vertically extend along the vehicle body frame provided vertically through a portion below the exhaust pipe.

6 Claims, 6 Drawing Sheets

FRONT STRUCTURE OF ALL TERRAIN VEHICLE

BACKGROUND OF THE INVENTION

1. Field of the Invention

The present invention relates to a front structure of an all terrain vehicle of straddle type such as buggy car.

2. Description of the Related Art

An engine unit, in which a belt continuously variable transmission (CVT) is provided integrally with an engine main body, and which is mounted in a saddle type all terrain vehicle (ATV) of course including a rough terrain vehicle (RTV), or a motorcycle, has a cooling structure for a vehicle transmission. The vehicle transmission cooling structure introduces, as a cooling air, a fresh air from an outside (external air) into, for example, a belt case containing the transmission through, for example, a duct to cool members within the belt case, and on the other hand, discharges the air, after cooling, into the atmosphere through, for example, a duct to thereby prevent heat generated by operation of the transmission from adversely influencing a V-belt, a seal member, etc.

An intake duct is often arranged, for example, in front of the engine and on a rear side of a radiator cooling fan disposed in a front portion of a vehicle body so that at least a part of the intake duct overlaps with the cooling fan in a front view to thereby realize compact piping (see, for example, Japanese Patent Laid-Open (KOKAI) Publication No. 2000-313382).

However, if an obstacle such as the intake duct is arranged on the rear side of the radiator cooling fan, an exhaust air from a radiator induced by the cooling fan does not smoothly flow rearward, which may result in deterioration in cooling performance of the engine and an adverse impact on the comfort of the rider due to heat damage.

Furthermore, if the exhaust air from the radiator does not flow smoothly, the heat damage may be also inflicted on an engine intake system, an engine exhaust system, and the like and the engine performance may possibly be further deteriorated. Especially, if a hot air which has passed through a radiator directly blows into an external air introducing duct for cooling the transmission, the intake air is warmed and the cooling performance to the V-belt, the seal member, and the like will be deteriorated.

SUMMARY OF THE INVENTION

The present invention has been achieved in view of the circumstances encountered in the prior art mentioned above, and an object of the present invention is to provide a front structure of an all terrain vehicle (ATV) capable of smoothly introducing a radiator exhaust air rearward so as to improve the cooling performance for cooling respective members of the vehicle.

The above and other objects can be achieved according to the present invention by providing a front structure of an all terrain vehicle, the all terrain vehicle including: a vehicle body; a vehicle body frame having left and right frame members connected integrally to each other; an engine unit including a belt transmission on one side and a cylinder assembly and mounted in a central lower portion of the vehicle body frame; a radiator for cooling the engine unit, the radiator being arranged at a central portion of the vehicle in a width direction with a distance from the engine unit and supported by the vehicle body frame; and an inlet duct for introducing a cooling air, the inlet duct permitting freshening of the air within a belt case, in which the belt transmission is disposed, to cool the belt case, wherein a cooling fan is provided on a rear surface of the radiator so that a central portion of the cooling fan is offset from a center of the radiator toward a side opposite to a side on which the belt transmission is arranged, an exhaust pipe connected to a front portion of the cylinder assembly is provided to extend toward the side on which the belt transmission is arranged so that the exhaust pipe extends downward at a portion above the belt transmission, and the inlet duct is provided on the side on which the exhaust pipe is provided so as to vertically extend along the vehicle body frame provided vertically through a portion below the exhaust pipe.

In a preferred embodiment, it may be desired that a storage space for a pair of left and right front cushion units arranged on both sides of the vehicle body in the width direction thereof, respectively, is formed directly in a rear portion of the radiator, and the inlet duct is arranged on the rear side of the storage space for one of the front cushion units on the side on which the belt transmission is arranged in a side view substantially along an axial direction of the front cushion unit substantially in a perpendicular direction.

It may be desired that the radiator is arranged so as to correspond to an upper portion of a vertical frame portion at a front end of the vehicle body frame substantially along a front portion of the vertical frame portion, a storage space is formed in front of the vertical frame portion so as to correspond to a lower portion of the vertical frame portion, and a ventilation path is formed for introducing a running air, into a space on the rear side of the radiator and surroundings of the exhaust pipe, from the storage space through a portion below the radiator and a lower portion of the vehicle body frame.

It may be also desired that the inlet duct is arranged outside the vehicle body frame vertically provided in the width direction of the vehicle body, and the vehicle body frame is provided so as to be interposed between the exhaust pipe and the inlet duct, the exhaust pipe being connected to a front portion of the cylinder assembly and bent to detour the cylinder assembly.

It may be also desired that the cylinder assembly is arranged so as to be inclined forward, an intake path and an engine intake system including an air cleaner are arranged above the cylinder assembly, a ventilation path is formed between an upper surface of the cylinder assembly and a bottom portion of the air cleaner to thereby form a space in the rear portion of the radiator to be continuous to a side space of the cylinder assembly, the exhaust pipe is provided so as to extend rearward substantially in a horizontal direction along the vehicle body frame on one side of the vehicle body in the width direction, an exhaust muffler device is connected to a downstream end of the exhaust pipe, and another ventilation path is formed over an entire length around the exhaust pipe and the exhaust muffler device.

It may be also desired that the inlet duct has an upstream end formed toward an inside of the vehicle body in the width direction so as to correspond to a space in the rear portion of the radiator, the upstream end is opened to provide a water proof structure thereon, and the water proof structure includes a baffle plate member provided with an intake opening formed on a side portion to a rear portion of the baffle plate member, the baffle plate member being provided on a part of a front surface inward of the vehicle body and a part of lower and upper surfaces outward of the vehicle body with respect to a tip end of the inlet duct.

According to the front structure of the all terrain vehicle of the present invention mentioned above, it becomes possible to secure the large capacity ventilation space near the rear portion of the radiator, to eliminate a member having a wide width dimension, and to create a smooth flow of the air exhausted or induced by the cooling fan. Therefore, the atmospheric temperature can be reduced, radiator cooling efficiency can be improved, and the improved cooling performance for cooling the respective members of the vehicle can be achieved.

Furthermore, the position in the vehicle body in which the engine unit is mounted can be set near the front side of the vehicle body to be closer to the radiator. In addition, the improved water proof structure can be provided so as to prevent the water or the like splashed by the front wheels from directly entering the interior of the inlet duct from the internal space in the front portion of the vehicle.

The nature and further characteristic features of the present invention will be made more clear from the following descriptions made with reference to the accompanying drawings.

DESCRIPTION OF THE PREFERRED EMBODIMENT

A preferred embodiment of the present invention will be described hereinafter with reference to the accompanying drawings.

Further it is first to be noted that terms such as "upper", "lower", "right", "left" and the like terms are used herein with reference to the illustrated state on the drawings or usual state of the vehicle on a ground.

Figure 1:
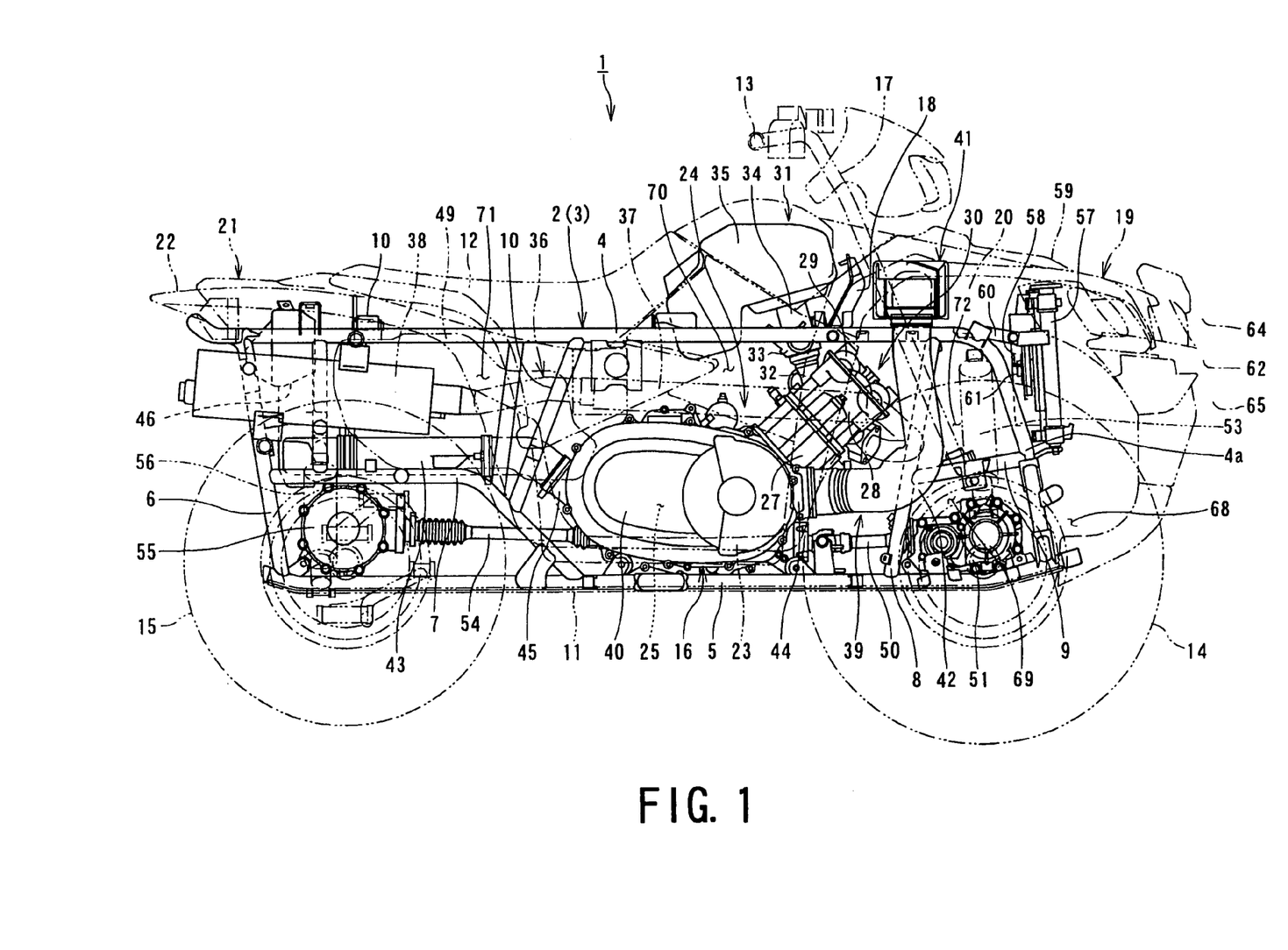
FIG. 1 is a right side view showing a front structure of an all terrain vehicle according to one embodiment of the present invention.
Figure 2:
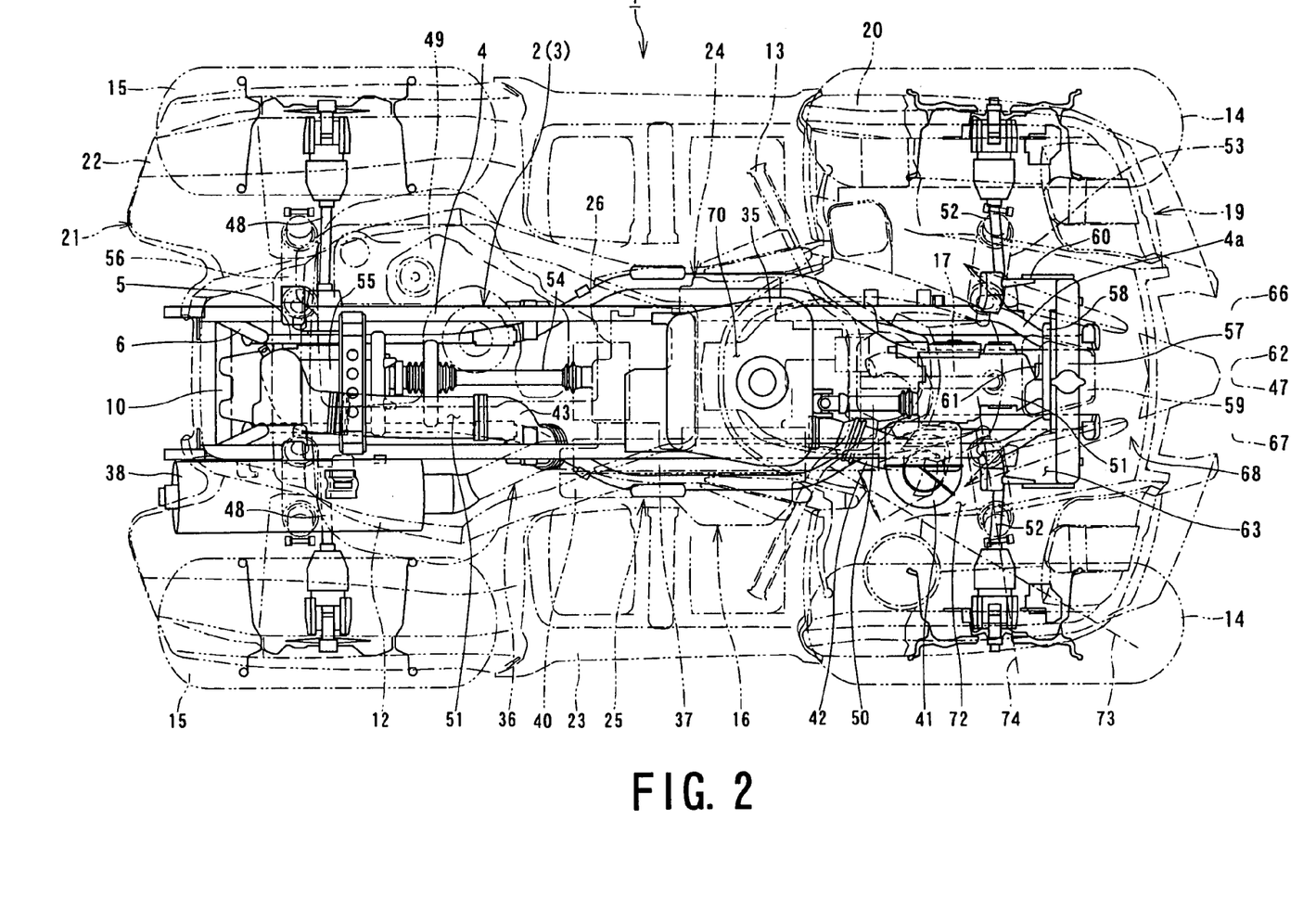
FIG. 2 is a plan view of the all terrain vehicle shown in FIG. 1.
Figure 3:
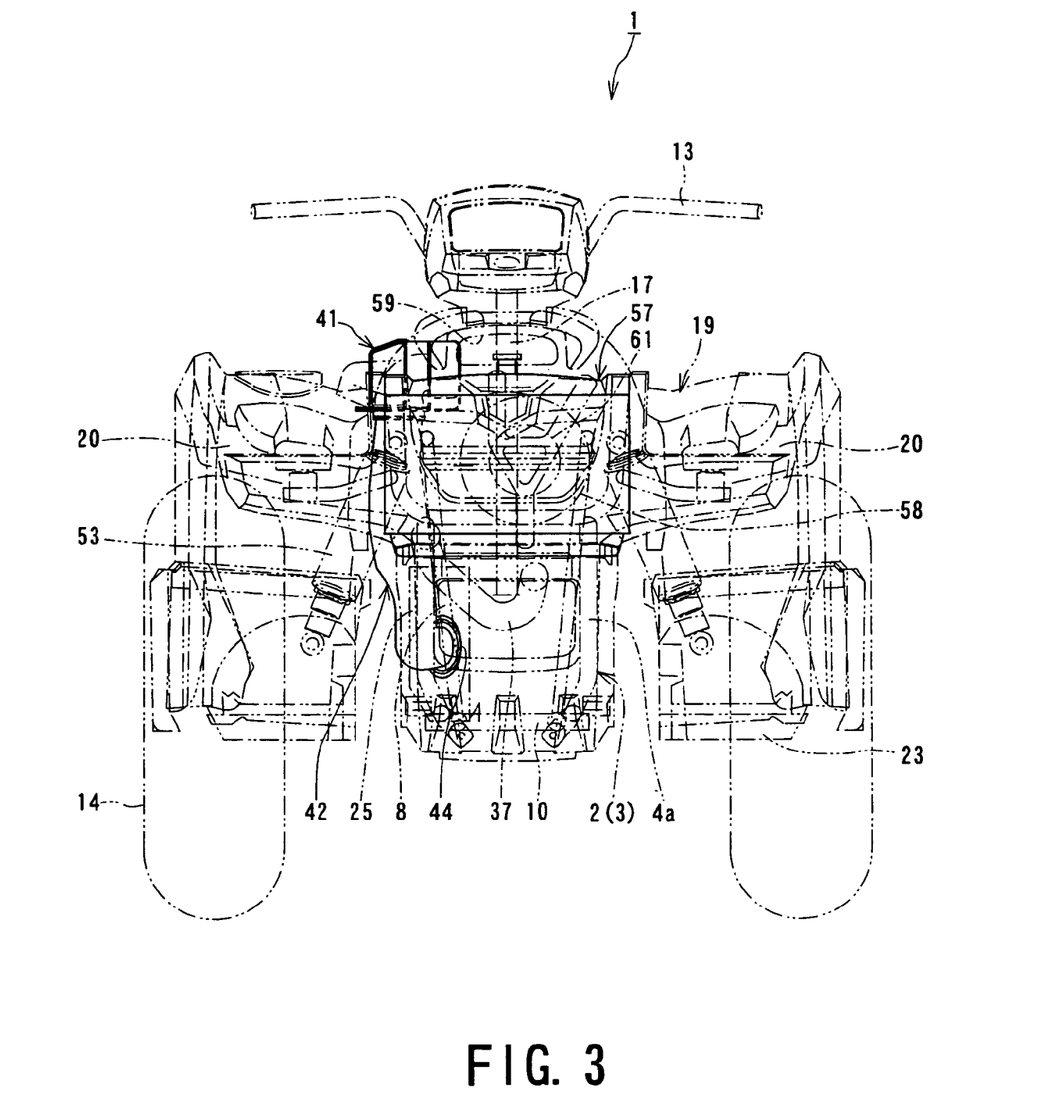
FIG. 3 is a front elevational view of the all terrain vehicle shown in FIG. 1.

With reference to FIGS. 1 to 3, a saddle type all terrain vehicle 1 (which may be called "ATV" hereinlater), for example, such as buggy car, includes a vehicle body frame 3 formed generally into a cage shape by coupling, for example, a pair of left and right steel frame members 2. Each frame member 2 includes a pair of left and right upper frames 4 and a pair of left and right lower frames 5. A front portion of each upper frame 4 is bent downward to form a vertical frame portion 4a, and a tip end of the vertical frame portion 4a is connected to a tip end of the corresponding lower frame 5.

The frame member 2 also includes: a pair of left and right rear vertical frames 6 each connecting a rear end of each upper frame 4 to that of the corresponding lower frame 5 in a vertical direction; a pair of left and right rear transverse frames 7 each connecting the rear vertical frame 6 to a generally central portion of the lower frame 5 in a longitudinal direction; a pair of left and right front vertical frames 8 each connecting each upper frame 4 to the corresponding lower frame 5 in a front portion of the frame member 2 in the vertical direction; a pair of left and right front transverse frames 9 each connecting each front vertical frame 8 to the vertical frame portion 4a of the corresponding upper frame 4 in the longitudinal direction; and a plurality of bridge members 10 connecting the left and right frame members 2 to each other.

The shape of the vehicle body frame 3 is a generally parallelogram almost close to a rectangular parallelepiped in a side view.

The upper frames 4 arranged with a distance from each other in a width direction of the vehicle 1 are arranged substantially linearly in parallel except for at their most end portions. The lower frames 5 arranged with a distance from each other in the width direction of the vehicle 1 are each of a meandering and bi-laterally symmetric shape such that a distance between front and rear portions of each lower frame 5 is smaller than that between front and rear portions of the corresponding upper frame 4, respectively, and such that a distance between intermediate portions of the lower frames 5 is larger than that between intermediate portions of the upper frames 4. By thus forming the upper and lower frames 4 and 5, the vehicle body frame 3 is formed to have inverted trapezoidal front and rear portions and a trapezoidal intermediate portion in a front view. The trapezoidal intermediate portion is set to be larger, in cross-sectional area, than the inverted trapezoidal front and rear portions.

Further, an under guard 11 formed of, for example, synthetic resin is provided in a range from a front portion to a rear portion of a lower surface of each lower frame 5 constituting the vehicle body frame 3 so as to shield a lower portion of the vehicle body frame 3.

A saddle type rider's seat 12 is provided above a rear portion of each upper frame 4 constituting the vehicle body frame 3, and a handle-bar 13 serving as a steering device of the vehicle 1 is provided in front of the rider's seat 12. Further, a pair of left and right front wheels 14 each having a wide low-pressure tire are provided in the front portion of the vehicle body frame 3 through a front suspension mechanism which is not shown in detail.

A pair of left and right rear wheels 15 each having a wide low-pressure tire are provided in the rear portion of the vehicle body frame 3 through a rear suspension mechanism which is not shown in detail. Each upper frame 4 is arranged substantially horizontally so as to connect portions near the upper ends of the corresponding front and rear wheels 14 and 15 to each other.

An engine unit 16 is mounted in a central lower portion of the vehicle body frame 3, i.e., between the front and rear wheels 14 and 15, below the upper frames 4, below the upper ends of the front and rear wheels 14 and 15, and on the rear side of the handle-bar 13.

A steering shaft 17 is provided so as to extend from a base portion of the handle-bar 13 to the front wheel 14, which, is located downward of the base portion thereof, forward obliquely.

A base portion of the steering shaft 17 is axially supported by, for example, a transverse crossing member, not shown, transversely extending between the left and right front transverse frames 9. A generally intermediate portion of the steering shaft 17 is axially supported by a support bracket 18 provided so as to extend upward from each upper frame 4.

A front cover 19 serving as a vehicle cover covering a portion above the front portion of the vehicle body frame 3 is provided to the front portion of the vehicle 1. A front fender 20 covering the left and right front wheels 14 is integrated with or formed integrally with the front cover 19. A rear cover 21 serving as the other vehicle cover covering a portion above the rear portion of the vehicle body frame 3 is provided to the rear portion of the vehicle 1.

A rear fender 22 covering the left and right rear wheels 15 is integrated with or formed integrally with the rear cover 21. The front cover 19 and the rear cover 21 are integrated with each other by connecting them at the intermediate portion of the vehicle 1, and a step board 23 is formed between the front fender 20 and the rear fender 22. These vehicle covers 19 to 23 are, for example, synthetic resin molded components and a space is formed between the vehicle covers 19 to 23 and each upper frame 4.

The engine unit 16 is configured, for example, so that an engine main body 24 is formed integrally with a belt (belt-type) continuously variable transmission (CVT) 25 disposed on, for example, a right side of the engine main body 24. The engine main body 24 is, for example, a water-cooled single-cylinder four-stroke-cycle engine. The engine main body 24 includes a crankcase 26 and a cylinder assembly 30 configured by an aluminum alloy cylinder block 27 arranged to be inclined forward in front of an upper surface of the crankcase 26 at a relatively large angle, a cylinder head 28, and a magnesium alloy head cover 29.

An engine intake system 31 is arranged in a space surrounded by an upper portion of the cylinder assembly 30, a front portion of the rider's seat 12, and a rear portion of the steering shaft 17. The engine intake system 31 includes a throttle body 33 connected to a rear portion of the cylinder head 28 through an intake passage 32, and an air cleaner 35 arranged above the throttle body 33 and in front of the rider's seat 12 and connected to an upstream side of the throttle body 33 through an intake pipe 34. The air cleaner 35 is arranged so as to protrude upward from an upper side of each upper frame 4.

An engine exhaust system 36 is arranged on one side of the engine main body 24 or, in this embodiment, on a right side thereof. The engine exhaust system 36 is composed of an exhaust pipe 37 connected to a front of the cylinder head 28 and an exhaust muffler device 38 connected to a downstream end of the exhaust pipe 37.

The exhaust pipe 37 is arranged so as to extend downward obliquely forward with respect to the cylinder head 28 to form a starting end, to gradually extend upward in an obliquely rearward direction while being bent into a U-shape to detour the cylinder assembly 30, to be bent toward a side on which the belt continuously variable transmission 25 is arranged, i.e., toward right rearward, and to extend generally horizontally in a rearward direction along each upper frame 4 of the vehicle body frame 3 above the belt continuously variable transmission 25 on the right of the engine unit 16. In addition, the engine pipe,37 is deflected from inside to outside of the upper frame 4 near a portion above and in rear of the belt continuously variable transmission 25.

The exhaust pipe 37 in rear of the crankcase 26 and the exhaust muffler device 38 are arranged so as to extend longitudinally to one side of the vehicle 1 in the width direction or, in this embodiment, below the outside of the right upper frame 4. In addition, the exhaust pipe 37 and the exhaust muffler device 38 are arranged, for example, above the rear wheels 15 and below the rear cover 21 in a side view.

The belt continuously variable transmission (CVT) 25 includes a transmission cooling system 39. The transmission cooling system 39 cools the belt continuously variable transmission 25 by permitting freshening of the air within a belt case 40 in which the belt continuously variable transmission 25 is accommodated.

The transmission cooling system 39 includes, as main constituent elements, a water proof structure 41, an inlet duct 42, and an outlet duct 43. The water proof structure 41 separates liquid and air of the external air introduced from the outside from each other. The inlet duct 42, which connects the water proof structure 41 to an intake port 44 formed in a front portion of the belt case 40, introduces cooling air into the belt case 40.

The outlet duct 43 is connected to an exhaust port 45 formed and opened at a rear portion of the belt case 40 to discharge an exhaust air that has cooled the belt continuously variable transmission 25. The outlet duct 43 extends on the same side as the exhaust muffler unit 38, i.e., the right side of the vehicle 1 from the exhaust port 45 of the belt continuously variable transmission 25 rearward and substantially horizontally in parallel to the upper frame 4, the rear transverse frame 7, and the exhaust muffler device 38. The outlet duct 43 then extends upward near a portion on the rear side of a right-side rear wheel axle 48 in a direction other than a substantially perpendicular direction, then in a different direction as compared to the right side of the vehicle 1 near a portion right under the rear end of the rider's seat 12, and then extends downward in a direction which is not a substantially perpendicular direction. Furthermore, a cooling air exhaust port 46 is formed on the lowest downstream of the outlet duct 43 toward a downward space. The outlet duct 43 extends upward at a portion near the rear side portion of the right-side rear wheel axle 48, and is then turned, below the rear end of the rider's seat 12, so as to have an inverted U-shaped such that the cooling air exhaust port 46 is opened downwardly at the lower end portion of the inverted outlet duct 43.

Further, a fuel tank 49 is arranged to a position below the rider's seat 12 in a plan view in a range from a rear end of the crankcase 26 to the neighborhood of a left-side rear wheel axle 48 on the side opposite to the engine exhaust system 36 and the transmission cooling system 39 with respect to a center line 47 of the vehicle 1.

A front wheel driving propeller shaft 50 extends forward from a front portion of the crankcase 26, which constitutes the engine main body 24, generally on the center line 47 of the vehicle 1 substantially in the horizontal direction. A front end of the propeller shaft 50 is coupled to a front differential device 51 arranged between the left and right lower frames 5 on the rear side of the vertical frame portion 4a of each upper frame 4. Further, a pair of left and right front wheel axles 52 extend from the front differential device 51 toward the left and right front wheels 14 so as to be coupled thereto, respectively. The left and right front wheels 14 are elastically supported in the vehicle body frame 3 by a pair of left and right front cushion units 53 constituting the front suspension mechanism.

A rear wheel driving propeller shaft 54 extends backward from a rear portion of the crankcase 26 generally on the center line 47 of the vehicle 1 substantially in the horizontal direction. A rear end of the propeller shaft 54 is coupled to a rear differential device 55 arranged between the left and right lower frames 5 in front of the rear vertical frame 6. Further, a pair of left and right rear wheel axles 48 extend from the rear differential device 55 toward the left and right rear wheels 15 so as to be coupled thereto, respectively. The left and right rear wheels 15 are elastically supported in the vehicle body frame 3 by a pair of left and right rear cushion units 56 constituting the rear suspension mechanism.

A radiator 57 serving as a heat exchanger for cooling the engine main body 24 is arranged near a top of the vehicle body frame 3 in front of the steering shaft 17. A cooling fan 58 for the radiator 57 is provided in a rear portion (on a rear surface) of the radiator 57. An external air inlet 59 is formed in the front cover 19 above the radiator 57.

The radiator 57 is a horizontally flat rectangular shape having a width (transverse dimension) larger than a height (longitudinal dimension). The radiator 57 is arranged at a central portion in the transverse direction of the vehicle 1 so that the center of the radiator 57 substantially coincides with the center line 47 of the vehicle 1. In addition, the radiator 57 is arranged so as to correspond to an upper portion of the vertical frame portion 4a at the front end of each of the left and right upper frames 4 bent downward substantially along the front of the vertical frame portion 4a.

A pair of left and right brackets 60 extend from neighborhoods of bent portions on the front end of the respective upper frames 4 while being enlarged in the width direction of the vehicle 1. These brackets 60 support both sides of the radiator 57, respectively. Further, the radiator 57 is arranged so that an upper portion of the radiator 57 is located above an upper surface of each of the left and right upper frames 4. The radiator 57 is set so as to have a height substantially equal to the heights of an upstream portion of the engine intake system 31, an intermediate portion of the steering shaft 17, and a seat surface of the rider's seat 12.

A rotational axis 62 of the cooling fan 58 and a driving motor 61 for the cooling fan 58 provided on the rear surface of the radiator 57, that is, a center line of the cooling fan 58, is arranged on an opposite side to the side on which the belt continuously variable transmission 25 is arranged in a maimer offset from the center of the radiator 57, i.e., in this embodiment, offset leftward in a traveling direction of the vehicle 1. The amount of this offsetting is set so as to be smaller than a difference between the vertical dimension and the transverse dimension of the horizontally flat radiator 57. Further, an indirect exhaust air space 63 having a width twice as large as this offset amount is formed on an opposite side to the side on which the cooling fan 58 and the driving motor 61 are offset, on the rear surface of the radiator 57.

The radiator 57 is arranged so that the rotational axis 62 of the driving motor 61 passes through a side portion of the steering shaft 17 and is directed toward a central portion to an upper half of the inclined upper surface of the head cover 29 covering the top of the cylinder head 28 if the rotational axis 62 extends rearward. Moreover, the radiator 57 is arranged so that a line 64 passes through the throttle body 33 and surroundings thereof if the line 64 extends rearward from an upper end of a locus of the cooling fan 58, and a line 65 passes through an attachment portion of the exhaust pipe 37 and surroundings thereof if the line 65 extends rearward from a lower end of the locus in a side view.

The attachment portion of the exhaust pipe 37 to be attached to the cylinder head 28 has a location offset to the same side as the cooling fan 58 in the front view thereof.

The height of a horizontal portion of the exhaust pipe 37 extending rearward substantially in the horizontal direction above the belt continuously variable transmission 25 is within a vertical range between the line 64 extending rearward from the upper end of the locus of the cooling fan 58 and the line 65 extending rearward from the lower end thereof in the side view. In addition, the exhaust pipe 37 is arranged at a position deviated from a horizontal range between lines 66 and 67 extending rearward from both ends of the locus of the cooling fan 58 in the width direction, respectively, in a plan view, toward the outside of the vehicle 1 in the width direction.

A storage space 68, in which an electric winch or the like, not shown, can be provided and is formed so as to correspond to the lower portion of the vertical frame portion 4a of the upper frame 4. The front portion thereof is located below the radiator 57 and is bent substantially downward in front of the lower portion thereof.

A ventilation path 69 passing from the storage space 68 through the portion below the radiator 57 and the lower portion of the vehicle body frame 3 is formed in the front portion of the vehicle 1. This ventilation path 69 is connected to the front surface of the crankcase 26 of the engine main body 24 through a space above the front differential device 51. A part of a running air passing this ventilation path 69 is induced by the exhaust air from the radiator 57, flows rearward of the vehicle 1 through surroundings of the engine main body 24, i.e., upward and sideward of the engine main body 24, and then flows into a space below the vehicle 1, surroundings of the rear wheels 15.

A longitudinal space is formed between one of both sides of the cylinder assembly 30 and the front cover 19 serving as the cover member, and a vertically flat space is formed between the other side of the cylinder assembly 30 and a bottom of the air cleaner 35 along an angled surface, in the side view, formed by the cylinder head 28, the rear surface of the head cover 29, and the rear surface of the cylinder block 27 around the cylinder assembly 30. Both of these spaces form another ventilation path 70 continuous to a space formed just right on the rear side of the radiator 57.

Further, since a left side of an internal space of the vehicle 1 in rear of the engine unit 16 is largely closed by the fuel tank 49, a further ventilation path 71 is formed to detour this fuel tank 49 over an entire length around the exhaust pipe 37 and the exhaust muffler device 38.

Figure 4:
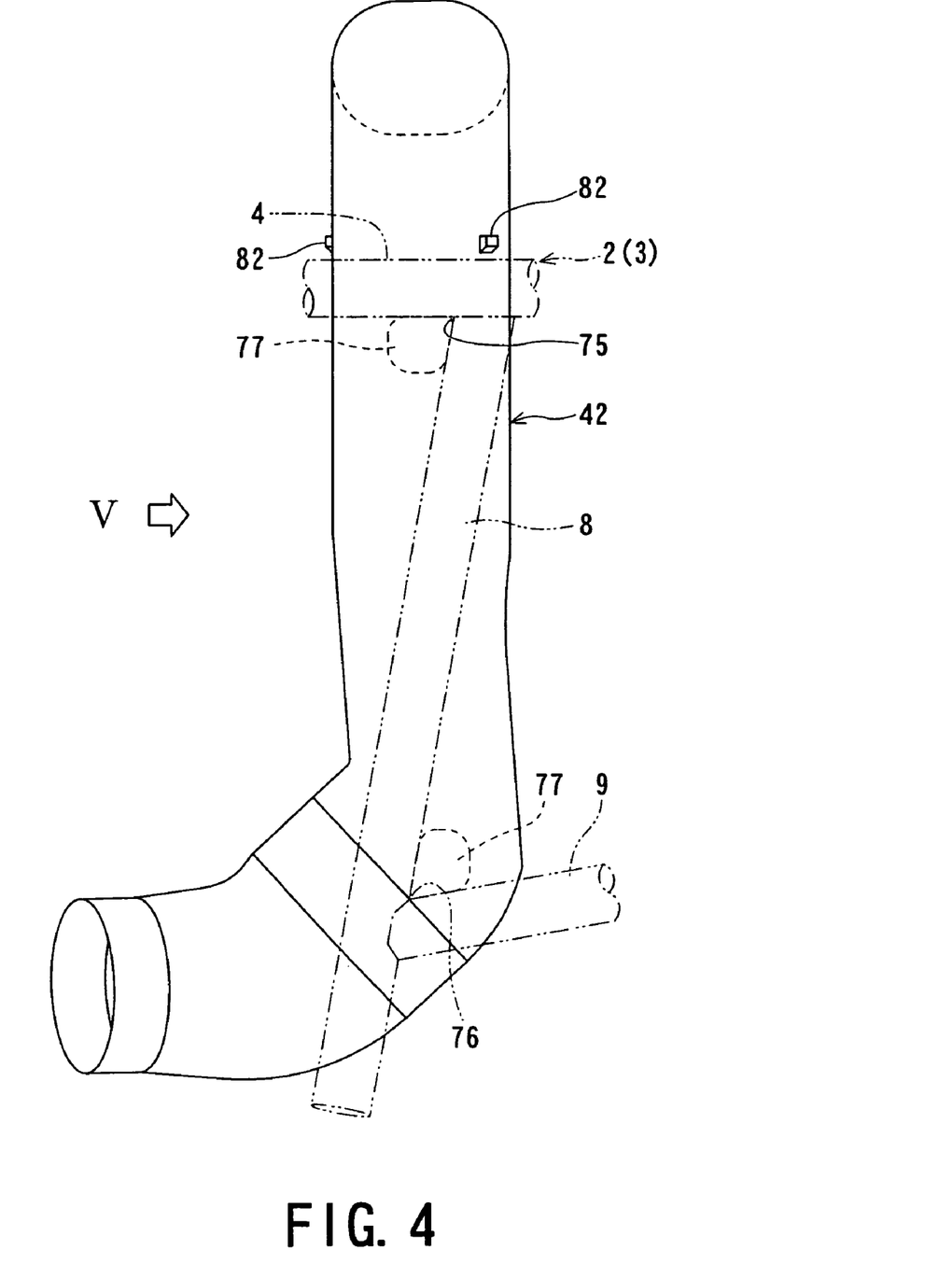
FIG. 4 is an illustration, in an enlarged right side view, of an inlet duct constituting a transmission cooling system.
Figure 5:
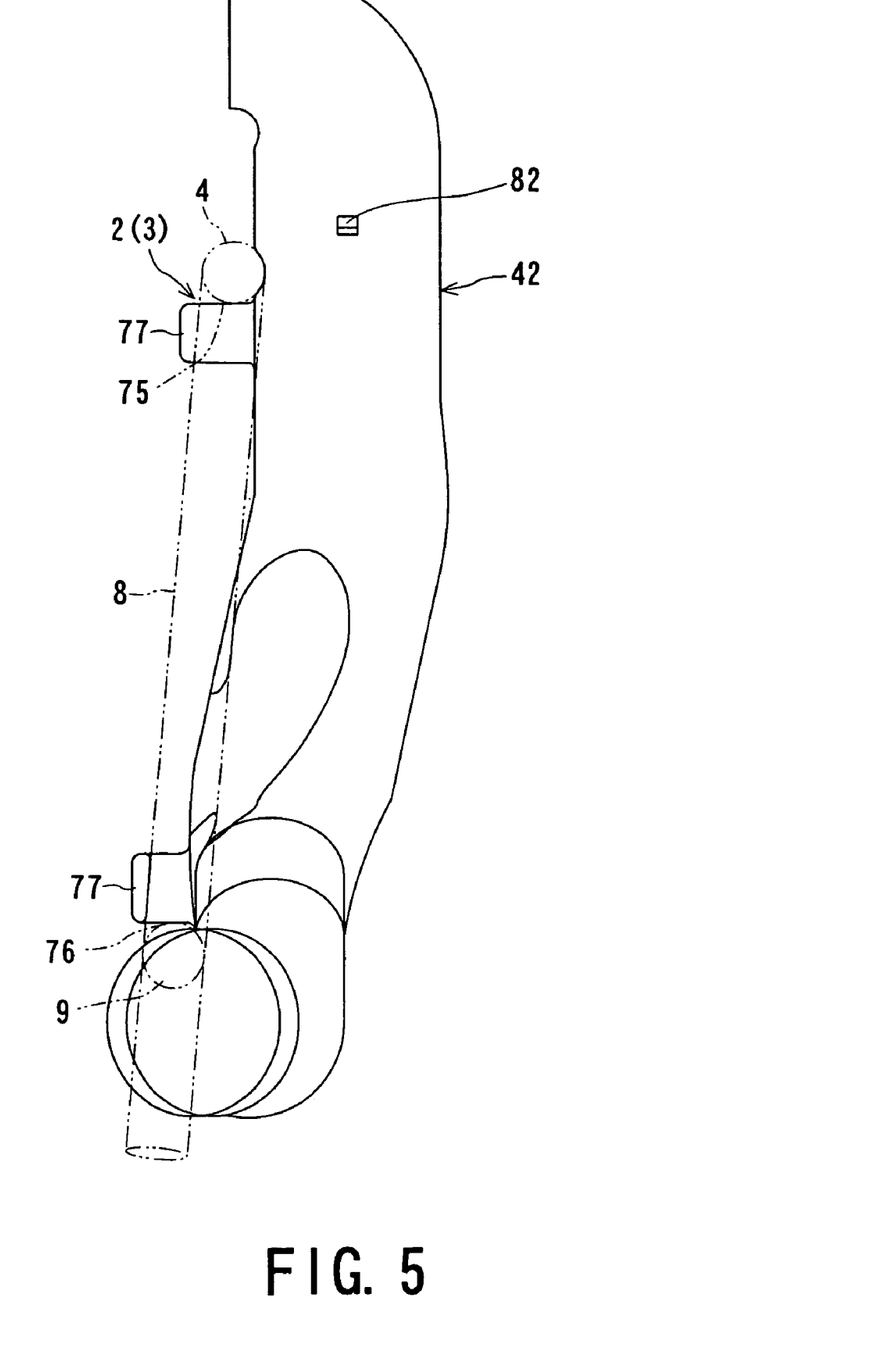
FIG. 5 is a view seen from a directional arrow V in FIG. 4 (an enlarged rear view of the inlet duct)

FIG. 4 shows the inlet duct 42 constituting the transmission cooling system 39, and FIG. 5 shows the inlet duct 42 seen from a directional arrow V shown in FIG. 4.

With reference to FIGS. 1 to 5, the inlet duct 42 is provided adjacent to one of the paired left and right front vertical frames 8 connecting the upper frames 4 to the lower frames 5 in the vertical direction in forward oblique manners in the front portion of the vehicle 1. The engine exhaust system 36 is provided on this side, i.e., the right-side front vertical frame 8.

The inlet duct 42 is formed of, for example, a synthetic resin so as to provide generally an L-shape in a side view along a plane formed by the vertical and longitudinal axes of the vehicle 1. The inlet duct 42 extends forward, below the exhaust pipe 37, from an attachment base portion attached to the intake port 44 of the belt case 40 at the lower end of the inlet duct 42 substantially in the horizontal direction.

In addition, the inlet duct 42 is bent upward on the side of the right-side front vertical frame 8 and extends upward along the right-side front vertical frame 8 substantially in the perpendicular direction. An upstream end of the inlet duct 42 is terminated toward the inside of the vehicle 1 in the width direction above an upper end surface of the upper frame 4 so as to correspond to the space in rear of the radiator 57. Thus, the upstream end of the inlet duct 42 is opened and the water proof structure 41 is provided on the upstream end.

Furthermore, the inlet duct 42 is provided along an outer edge of the radiator 57 extending in the vertical direction so as to protrude toward the outside of the vehicle 1 in the width direction on one side end of the radiator 57 in the width direction, e.g., on a right side end thereof in the front view.

A storage space 72 for the paired left and right front cushion units 53, which are arranged on both the sides of the vehicle 1, respectively, in the width direction, is formed just rearward of the radiator 57.

The inlet duct 42 is arranged on the rear side of the storage space 72 for the right-side front cushion unit 53 substantially in the vertical direction along the axial direction of this right-side front cushion unit 53 in the side view. In addition, the inlet duct 42 is stored in a triangle pole space surrounded by an internal surface of a maximum steered position 73 of the right-side front wheel 14 serving as a handle-bar, a right-side end surface of the vehicle body frame 3, and a movable surface 74 of the corresponding front cushion unit 53 in the plan view.

Further, it is noted that the movable surface 74 of the front cushion unit 53 is a virtual space formed basically by causing the front cushion unit 53 to rotate about the attachment position on the upper end of the unit 53.

The inlet duct 42 is provided so that the right-side front vertical frame 8 is interposed between the inlet duct 42 and the exhaust pipe 37 connected to the front of the cylinder head 28. Further, the inlet duct 42 is provided so as to substantially overlap with the steering shaft 17 extending from the base portion of the handle-bar 13 toward the front wheel 14 obliquely forward of and below the handle-bar 13 in the side view. The frontmost end position of the inlet duct 42 is located on the rear side of the attachment base portion of the lower end of the steering shaft 17.

As described above, this inlet duct 42 is provided adjacent the right-side front vertical frame 8, positioned at connection points at which the members forming the vehicle body frame 3 are connected to each other, and detachably fixed to the right-side front vertical frame 8.

In this embodiment, the connecting points are specifically set to an intersecting portion 75 between the upper end of this right-side front vertical frame 8 and the upper frame 4, and an intersecting portion 76 (connecting portion) between the lower portion of the right-side front vertical frame 8 and the right-side front transverse frame 9 connecting, in the longitudinal direction, this right-side front vertical frame 8 to the front portion of the upper frame 4 in the right-side longitudinal frame 8 disposed adjacent to the inlet duct 42.

These upper and lower intersecting portions 75 and 76 are set longitudinally and alternately with the right-side transverse frame 9 being interposed therebetween, i.e., in a positional relationship of alternate-interior angles, at acute angles equal to or narrower than 90 degrees. The inlet duct 42 is positioned to two orthogonal directions in an interposed angle space formed by these intersecting portions 75 and 76.

Engagement protrusions 77 protruding inward of the vehicle 1 are formed on an inside surface of the inlet duct 42 so as to correspond to the respective intersecting portions 75 and 76. When these engagement protrusions 77 are engaged with the respective intersecting portions 75 and 76, a tension is generated by assembling the inlet duct 42 with the frame 8 due to the rigidity of the inlet duct 42 for holding its shape. This tension contributes to holding the inlet duct 42 at a predetermined position.

Figure 6:
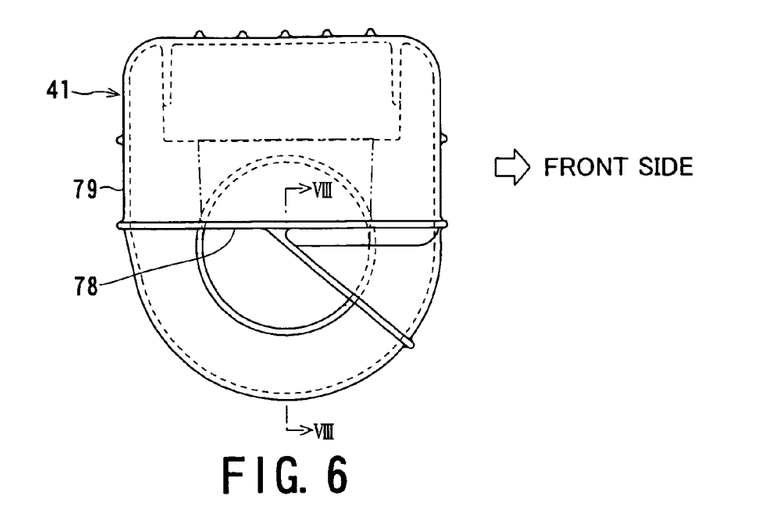
FIG. 6 is a plan view of a water proof structure for the duct.
Figure 7:
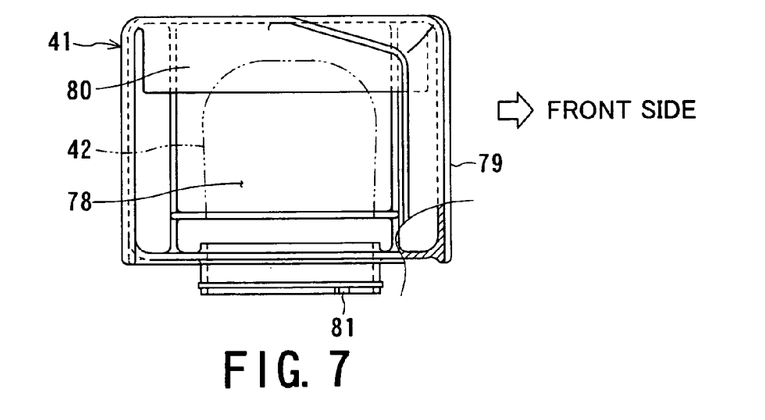
FIG. 7 is a right side view of the water proof structure for the duct.
Figure 8:
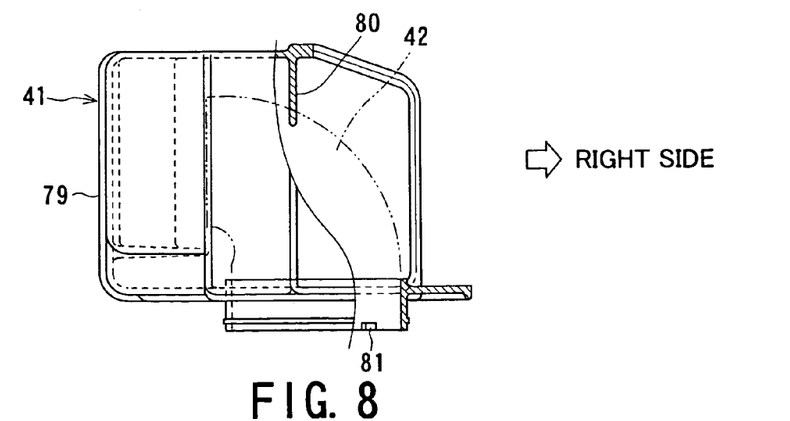
FIG. 8 is a rear view of the water proof structure for the duct.

FIGS. 6 to 8 represent the water proof structure 41 attached to the upstream end of the inlet duct 42.

With reference to FIGS. 6 to 8, the water proof structure 41 is composed of a baffle plate member 79 including an intake opening 78 formed on a side portion to a rear portion thereof, and the baffle plate member 79 is folded three-dimensionally. The baffle plate member 79 is provided on a part of upper and lower surfaces and an inside surface, which are positioned inward of the vehicle 1 relative to the tip end of the inlet duct 42, i.e., the upstream end of the inlet duct 42, and a part of front and lower surfaces and an upper surface which are positioned outward of the vehicle 1. The baffle plate member 79 is provided to be foldable at the opening at the upstream end of the inlet duct 42 so as to surround the upstream end of the inlet duct 42.

The water proof structure 41 is formed of a material, for example, rubber having flexibility, elasticity, and low temperature conductivity. By deforming the water proof structure 41, the water proof structure 41 is fitted into and fixed to an exterior of the upstream end of the inlet duct 42 formed three-dimensionally.

Further, a rib 80, which can prevent water from entering from the outside, is provided so as to extend through lower and upper positions of the water proof structure 41 around the opening 78 thereof on the upstream end of the inlet duct 42. This rib 80 can make the water proof structure 41 substantially equal to the inlet duct 42 in a cross-sectional area of a passage. This water proof structure 41 is positioned and secured by engaging an engagement protrusion 82 formed on an outside surface of the inlet duct 42 with a recess 81 formed on a lower portion of the water proof structure 41.

The embodiment of the structure described above will operate and function in the following manner.

The cooling fan 58 provided on the rear surface of the radiator 57 is arranged so that the center of the cooling fan 58 is offset from the center of the radiator 57 to the side opposite to the side on which the belt continuously variable transmission (CVT) 25 is arranged.

The exhaust pipe 37 connected to the front side of the cylinder head 28 of the engine main body 24 is provided so as to extend to the side on which the continuously variable transmission 25 is arranged.

The inlet duct 42 for introducing the cooling air into the belt case 40 including the continuously variable transmission 25 is arranged on the side on which the engine exhaust system 36 is arranged. In addition, the inlet duct 42 is arranged so as to vertically extend along the member of the vehicle body frame 3 arranged vertically through the portion below the exhaust pipe 37, i.e., in this embodiment, the right-side front vertical frame 8.

It is therefore possible to surely secure a large capacity ventilation space near the rear of the radiator 57. In addition, a member having a width dimension can be eliminated, the flow of the air exhausted or inducted by the cooling fan 58 can be made smooth, and an atmospheric temperature can be reduced. Further, the inlet duct 42 can be made compact and light in weight.

Furthermore, the storage space 72 for the paired left and right front cushion units 53 arranged on both the sides of the vehicle 1 in the width direction, respectively, is formed just on the rear side of the radiator 57.

In addition, the inlet duct 42 is arranged on the side on which the belt continuously variable transmission 25 is arranged in the side view, i.e., in this embodiment, on the rear side of the storage space 72 for the right-side front cushion unit 53 to be substantially along the axial direction of this right-side front cushion unit 53 substantially in the perpendicular direction.

Accordingly, it is possible to secure the large capacity ventilation space near the rear portion of the radiator 57, a member having a wide width dimension can thus be eliminated, and the flow of the air exhausted by the cooling fan 58 or the induced air can be made smooth. The atmospheric temperature can be hence reduced. In addition, since no obstacle against the exhaust air is present on the rear side of the radiator 57, the position of mounting the engine unit 16 can be set toward the front of the vehicle 1 to be closer to the radiator 57.

Furthermore, the radiator 57 is arranged so as to correspond to the upper portion of the vertical frame portion 4a on the front end of each of the left and right upper frames 4 bent substantially downward along the front portion of the vertical frame portion 4a.

The storage space 68 is formed in front of the vertical frame portion 4a of the corresponding upper frame 4 so as to correspond to the lower portion of the vertical frame portion 4a.

The ventilation path 69 is formed so as to pass through this storage space 68, the portion below the radiator 57 and the lower portion of the vehicle body frame 3 so as to introduce the running air into the space on the rear side of the radiator 57 through the space above the front differential device 68, i.e., into the front surface of the engine main body 24 and the surroundings of the exhaust pipe 37, that is, the attachment portion of the exhaust pipe 37 attached to the cylinder head 28 and the bent portion of the exhaust pipe 37.

It is therefore possible to introduce and combine the running air into the air induced by the cooling fan 58, improve the cooling efficiency of the radiator 57 and reduce the atmospheric temperature of the space at the rear portion of the radiator 57.

Furthermore, the inlet duct 42 is arranged outside the right-side front vertical frame 8 in the width direction of the vehicle 1. This right-side front vertical frame 8 is provided so as to be interposed between the inlet duct 42 and the exhaust pipe 37 connected to the front portion of the cylinder head 28 and to gradually extend upward in the obliquely rearward direction while being bent so as to detour the cylinder assembly 30.

According to such arrangement, it is possible to suppress the temperature rising of the inlet duct 42 by the introduction of the running air and by means of the right-side front vertical frame 8 having a large heat capacity, thus improving the cooling efficiency of the belt continuously variable transmission 25.

Moreover, the cylinder assembly 30 of the engine main body 24 is arranged in the manner inclined forward at the relatively large angle, the intake path 32 and the engine intake system 31 such as the air cleaner 35 are arranged above the cylinder assembly 30, and the ventilation path 70 is formed between the rear surface of the cylinder assembly 30, that is, the upper surface thereof and the bottom of the air cleaner 35 to thereby form the space just on the rear side of the radiator 57 to be continuous to the sideway space of the cylinder assembly 30.

In addition, the exhaust pipe 37 is provided so as to extend rearward substantially in the horizontal direction along the upper frame 4 on one side of the vehicle 1 in the width direction, the exhaust muffler device 38 is connected to the downstream end of the exhaust pipe 37, and the other ventilation path 71 is formed over the entire length around the exhaust pipe 37 and the exhaust muffler device 38.

It is therefore possible to introduce the running air and the exhaust air from the radiator 57 to the surroundings of the engine exhaust system 36 arranged on the side opposite to the side on which the cooling fan 58 is offset at the rear portion of the vehicle 1 relative to the sideway offset of the cooling fan 58 in front of the vehicle 1, so as to cross the interior of the vehicle 1 obliquely.

Still furthermore, when the cylinder assembly 30 is arranged in the manner inclined forward at the relatively large angle, the flat surface parallel to a core surface of the radiator 57 which interrupts or cuts the exhaust direction of the cooling fan 8 can be eliminated. As a result, no hot air stays. If the external air inlet 59 is formed in the front cover 19 above the radiator 58, the high temperature air does not stay inside the vehicle 1 and ventilation of the air is accelerated.

It is therefore possible to effectively reduce the atmospheric temperature inside the vehicle 1.

Still furthermore, in the arrangement in which the steering shaft 17, the cylinder head 28 of the cylinder assembly 30, and the intake path 32 are arranged in this order so as to coincide with the center line 47 of the vehicle 1 at the rear portion of the radiator 57, the rectangular parallelepiped space can be used as the ventilation space as it is substantially within the range of the widths of the left and right upper frames 4. Accordingly, the exhaust air from the radiator 57 can be introduced to pass through both the side surfaces of the steering shaft 17, the upper (rear) surface and both the side surfaces of the cylinder assembly 30, both the sides of the intake path 32, and the upper surface of the crankcase 26.

In addition, the upstream end of the inlet duct 42 is formed toward the inside of the vehicle 1 in the width direction so as to correspond to the space on the rear side of the radiator 57, and the upstream end is opened to provide the water proof structure 41 thereon. The water proof structure 41 is composed of the baffle plate member 79 including the intake opening 78 formed from the side portion to the rear portion of the baffle plate member 79. The baffle plate member 79 is provided on a part of the front surface inward of the vehicle 1 and the lower and upper surfaces outward of the vehicle 1 relative to the tip end of the inlet duct 42.

It is therefore possible to prevent water or the like splashed by the front wheels 14 from directly entering the interior of the inlet duct 42 from the internal space in front of the vehicle 1.

It is to be noted that the present invention is not limited to the described embodiment and many other changes and modifications may be made without departing from the scopes of the appended claims.

What is claimed is:

1. A front structure of an all terrain vehicle, the all terrain vehicle including: a vehicle body; a vehicle body frame having left and right frame members connected integrally to each other; an engine unit including a belt transmission positioned on one side thereof and a cylinder assembly mounted in a central lower portion of the vehicle body frame; a radiator for cooling the engine unit, the radiator being arranged at a central portion of the vehicle in a width direction thereof, spaced a distance from the engine unit and supported by the vehicle body frame; and an inlet duct for introducing cooling air, said inlet duct introducing fresh air within a belt casing portion of the belt transmission is disposed so as to cool the belt case, wherein a cooling fan is provided on a rear surface of the radiator so that a central portion of the cooling fan is offset from a center portion of the radiator and is positioned toward a side opposite a side on which the belt transmission is arranged, an exhaust pipe connected to a front portion of the cylinder assembly and provided so as to extend toward a side of the vehicle frame on which the belt transmission is arranged so that the exhaust pipe extends downward at a portion of the vehicle located above the belt transmission, and the inlet duct is provided on the side of the vehicle frame on which the exhaust pipe is provided so as to vertically extend along the vehicle body frame and to extend vertically through a portion of the vehicle located below the exhaust pipe.

2. The front structure of the all terrain vehicle according to claim 1, wherein a storage space for a pair of left and right front cushion units arranged on both sides of the vehicle body in the width direction thereof, respectively, is formed in a rear portion of the radiator, and the inlet duct is arranged on the rear side of the storage space for one of the front cushion units on a side of the vehicle on which the belt transmission is arranged as seen in a side view extending substantially along an axial direction of the front cushion unit and substantially in a perpendicular direction.

3. The front structure of the all terrain vehicle according to claim 1, wherein the radiator is arranged so as to correspond to an upper portion of a vertical frame portion at a front end of the vehicle body frame substantially along a front portion of the vertical frame portion, a storage space is formed in front of the vertical frame portion so as to correspond to a lower portion of the vertical frame portion, and a ventilation path is formed for introducing a stream of air, into a space on the rear side of the radiator and surroundings of the exhaust pipe, from the storage space through a portion below the radiator and a lower portion of the vehicle body frame.

4. The front structure of the all terrain vehicle according to claim 1, wherein the inlet duct is arranged outside the vehicle body frame in a width direction of the vehicle body, and wherein the vehicle body frame is provided so as to be interposed between the exhaust pipe and the inlet duct, the exhaust pipe being connected to a front portion of the cylinder assembly and being bent so as to be deviated from the area of location of the cylinder assembly.

5. The front structure of the all terrain vehicle according to claim 1, wherein the cylinder assembly is arranged so as to be inclined forward, an intake path and an engine intake system including an air cleaner which are arranged above the cylinder assembly, a ventilation path is formed between an upper surface of the cylinder assembly and a bottom portion of the air cleaner to thereby form a space in the rear portion of the radiator to be continuous to a side space of the cylinder assembly, the exhaust pipe is provided so as to extend rearward substantially in a horizontal direction along the vehicle body frame on one side of the vehicle body in the width direction, and wherein an exhaust muffler device is connected to a downstream end of the exhaust pipe, and an additional ventilation path extends over an entire length portion around the exhaust pipe and the exhaust muffler device.

6. The front structure of the all terrain vehicle according to claim 1, wherein the inlet duct has an upstream end positioned at an inside portion of the vehicle body in the width direction thereof so as to correspond to a space located in the rear portion of the radiator, an upstream end of the inlet duct being opened so as to provide a water proof structure thereon, and the water proof structure includes a baffle plate member provided with an intake opening formed from a side portion to a rear portion of the baffle plate member, the baffle plate member being provided on a part of a front surface inward of the vehicle body and on a part of lower and upper surfaces outward of the vehicle body with respect to a tip end of the inlet duct.

* * * * *